United States Patent
Nakajima

(10) Patent No.: US 12,306,197 B2
(45) Date of Patent: May 20, 2025

(54) AUTOMATIC ANALYZER AND CONTROL METHOD FOR AUTOMATIC ANALYZER

(71) Applicant: JEOL Ltd., Tokyo (JP)

(72) Inventor: Takeichirou Nakajima, Tokyo (JP)

(73) Assignee: JEOL Ltd., Tokyo (JP)

( * ) Notice: Subject to any disclaimer, the term of this patent is extended or adjusted under 35 U.S.C. 154(b) by 891 days.

(21) Appl. No.: 17/229,155

(22) Filed: Apr. 13, 2021

(65) Prior Publication Data

US 2021/0318347 A1 Oct. 14, 2021

(30) Foreign Application Priority Data

Apr. 14, 2020 (JP) .................................. 2020-072337

(51) Int. Cl.
G01N 35/00 (2006.01)

(52) U.S. Cl.
CPC ......... G01N 35/00732 (2013.01); *G01N 2035/00752* (2013.01); *G01N 2035/00851* (2013.01)

(58) Field of Classification Search
CPC ... G01N 35/00732; G01N 2035/00752; G01N 2035/00851; G01N 35/00584
See application file for complete search history.

(56) References Cited

U.S. PATENT DOCUMENTS

| | | | |
|---|---|---|---|
| 4,706,207 A | 11/1987 | Hennessy et al. | |
| 2005/0009122 A1* | 1/2005 | Whelan | B01L 3/545 |
| | | | 435/7.32 |
| 2005/0205673 A1 | 9/2005 | Morris | |
| 2008/0240989 A1* | 10/2008 | Iwamatsu | G01N 35/00663 |
| | | | 422/68.1 |
| 2009/0058617 A1 | 3/2009 | Wu et al. | |
| 2010/0054997 A1 | 3/2010 | Ooe | |
| 2016/0232315 A1 | 8/2016 | Reynolds | |
| 2021/0293837 A1* | 9/2021 | Sugiyama | G01N 35/0092 |

FOREIGN PATENT DOCUMENTS

| | | |
|---|---|---|
| EP | 2161581 A2 | 10/2010 |
| JP | 63500398 A | 2/1998 |
| JP | 200963557 A | 3/2009 |
| JP | 2016538572 A | 12/2016 |
| JP | 20189841 A | 1/2018 |
| JP | 2018009841 A * | 1/2018 |

OTHER PUBLICATIONS

Extended European Search Report issued in EP21167662.2 on Sep. 7, 2021.
Office Action issued in JP2020072337 on Dec. 28, 2021.

* cited by examiner

*Primary Examiner* — John McGuirk
(74) *Attorney, Agent, or Firm* — The Webb Law Firm

(57) ABSTRACT

An automatic analyzer includes a code input unit that inputs a code encoded including parameter information related to sample measurement, a decoding unit that decodes the code input by the code input unit, and a control unit that updates, based on the parameter information generated by decoding the code by the decoding unit, a parameter applied before decoding the code.

12 Claims, 8 Drawing Sheets

| T1-1 | CODE IDENTIFIER | |
|---|---|---|
| T1-2 | MODEL | |
| T1-3 | ISSUE SOURCE | |
| T1-4 | ISSUE ID | |
| T1-5 | EXPIRATION DATE | |
| T1-6 | MACHINE NO. (SERIAL, SPECIFIC OPERATION SYSTEM INFORMATION) | |
| T1-6-1 | APPLICABLE CONDITION (VERSION RANGE, OPTION) | |
| T1-7 | UPDATING DATA TABLE | PLURAL |
| T1-8 | PARAMETER ADDRESS (NO., ID, ETC.) | PLURAL |
| T1-9 | PARAMETER VALUE | PLURAL |
| T1-10 | COMMAND (FUNCTION) | PLURAL |

FIG. 5

| SECTION | No. | PARAMETER NAME | ACCESS | SET VALUE | DEFAULT VALUE | COMMENT |
|---|---|---|---|---|---|---|
| BIOCHEMICAL UNIT | 782 | ○○○SENSOR, NUMBER OF CHECKS | Lv.5 | 80 | 80 | |
| BIOCHEMICAL UNIT | 783 | △△△SENSOR, NUMBER OF CHECKS | Lv.5 | 80 | 80 | |
| BIOCHEMICAL UNIT | 784 | □□□SENSOR, NUMBER OF CHECKS | Lv.5 | 80 | 80 | |
| BIOCHEMICAL UNIT | 785 | ○○○THRESHOLD (mm) | Lv.5 | 45 | 45 | 1~50 |
| BIOCHEMICAL UNIT | 786 | ○○○ADJUSTMENT FUNCTION | Lv.5 | 0 | 0 | 0: DISABLE 1: ENABLE |
| BIOCHEMICAL UNIT | 801 | ○○△POSITION BOTTOM DEAD CENTER PULSE (mm) | Lv.4 | 150.0 | 150.0 | |
| BIOCHEMICAL UNIT | 802 | ○△△POSITION BOTTOM DEAD CENTER PULSE (mm) | Lv.4 | 40.7 | 40.7 | |
| BIOCHEMICAL UNIT | 803 | ○○□POSITION BOTTOM DEAD CENTER PULSE (mm) | Lv.5 | 32.0 | 32.0 | |
| BIOCHEMICAL UNIT | 804 | ○□□POSITION BOTTOM DEAD CENTER PULSE (mm) | Lv.4 | 140.0 | 140.0 | |
| BIOCHEMICAL UNIT | 805 | □□□POSITION BOTTOM DEAD CENTER PULSE (mm) | Lv.4 | 140.0 | 140.0 | |
| BIOCHEMICAL UNIT | 806 | □○○POSITION BOTTOM DEAD CENTER PULSE (mm) | Lv.4 | 40.7 | 40.7 | |
| BIOCHEMICAL UNIT | 807 | ○△□POSITION BOTTOM DEAD CENTER PULSE (mm) | Lv.5 | 32.0 | 32.0 | |
| BIOCHEMICAL UNIT | 808 | △△△POSITION BOTTOM DEAD CENTER PULSE (mm) | Lv.4 | 55.0 | 55.0 | |
| BIOCHEMICAL UNIT | 809 | △□□POSITION BOTTOM DEAD CENTER PULSE (mm) | Lv.4 | 150.0 | 150.0 | |

51 CODE INPUT

FIG. 6

CODE

[7x`1qP956oEX!W%{8!i4f`R)>|

52
53
54 OK
56 HISTORY
55 CANCEL

FIG. 7

| CODE ID | SPA1-00005-8888 |
|---|---|
| MODEL | JCA-B1234 |
| MACHINE NO. | CA111188888888 |
| EXPIRATION DATE | DECEMBER, 2020 |
| REMARKS | 2020 RELEASED, CONSUMABLES |
| OPERATION PROCEDURE | 1. LOG IN WITH manager AUTHORITY.<br>2. OPEN MENU → SETTING → SYSTEM PARAMETER.<br>3. [EDIT] → PRESS [CODE INPUT] BUTTON.<br>4. READ ALL CODES ONE BY ONE SEQUENTIALLY.<br>5. PRESS [OK] BUTTON, AND OPERATE ACCORDING TO MESSAGE. |
| IMPLEMENTATION RECORD NAME, DATE AND TIME, MACHINE NO. | |

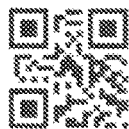

| DATE AND TIME | TYPE AND IDENTIFIER | OPERATOR | DETAILS |
|---|---|---|---|
| 2018/09/26 16:11:22 | MEASUREMENT CONDITION PARAMETER (QC) | Manager | 042. AST rev.07b |
| 2019/10/22 15:09:47 | LIS DOWNLOAD | TechManager | MAC Port AUTHENTICATION |
| 2020/02/07 19:57:06 | CODE SP-00005-8888 | T.Suzuki | SYSTEM PARAMETER: BIOCHEMICAL 809: 150.0 —> 145.0 |

PRINT

CLOSE

AUTOMATIC ANALYZER AND CONTROL METHOD FOR AUTOMATIC ANALYZER

CROSS-REFERENCE TO RELATED APPLICATION

This application claims priority to Japanese Patent Application No. 2020-072337 filed Apr. 14, 2020, the disclosure of which is hereby incorporated by reference in its entirety.

BACKGROUND OF THE INVENTION

Field of the Invention

The present invention relates to an automatic analyzer and a control method for the automatic analyzer.

Description of Related Art

An automatic analyzer is a device that analyzes multi-components contained in a sample quickly and with high accuracy, and is used in various fields, such as biochemical tests and blood transfusion tests. Various parameters are set in the automatic analyzer. JP 2009-63557 A describes a technique relating to a system setting method for a color-developing inspection chip analyzer whose applicable range can be expanded by changing a parameter of the analyzer.
[Patent Literature 1] Japanese Laid-Open No. 2009-63557.

SUMMARY OF THE INVENTION

An automatic analyzer has a function to change a parameter, but a range of parameters that can be changed differs by an authority. Specifically, when comparing a service authority given to a service staff of a manufacturer of the automatic analyzer and a user administrator authority given to a user administrator who uses the automatic analyzer provided by the manufacturer, the service authority has a broader range of parameters that can be changed. For this reason, there may be a case where the operation of the automatic analyzer stops due to some reason, and it may be necessary to reset a parameter that cannot be changed by the user administrator authority in order to restart the operation. In such a case, it is necessary to restart the operation of the automatic analyzer by the following procedure.

First, the user notifies a service window of the manufacturer of a situation in which the operation of the automatic analyzer has stopped via telephone, e-mail, fax, or the like. Next, the manufacturer who receives the contact from the user arranges a service staff to visit the user. After that, the service staff of the manufacturer goes to the user's place to operate the automatic analyzer, identifies a cause of an operation stop, and then changes a parameter necessary for restarting the operation in association with a repair or emergency measure. To restart the operation of the automatic analyzer according to such a procedure, the operation of the automatic analyzer is stopped for a long time.

As a method of shortening the operation stop time of the automatic analyzer, it is considered to inform the user of login information used for the service authority and have the user change a parameter necessary for restarting the operation. However, among various parameters set in the automatic analyzer, there are many parameters that cannot be disclosed to the user due to business reasons, such as a know-how not desirable to be known to the third party including the user. Further, when the user enters a wrong parameter value or when the user selects a wrong type of parameter and changes its parameter value, an accurate analysis result may not be obtained or the analyzer may break down. Therefore, the manufacturer cannot adopt the above method.

It is therefore an object of the present invention to provide an automatic analyzer and a control method for the automatic analyzer that can quickly and accurately support a change of a parameter beyond the user administrator authority without the user knowing the parameter.

An automatic analyzer according to the present invention has a code input unit that inputs a code encoded including parameter information related to sample measurement, a decoding unit that decodes the code input by the code input unit, and a control unit that updates, based on the parameter information generated by decoding the code by the decoding unit, a parameter applied before decoding the code.

A control method for an automatic analyzer according to the present invention includes an input step of inputting a code encoded including parameter information related to sample measurement, a decoding step of decoding the code input in the input step, and an update step of updating, based on the parameter information generated by decoding the code in the decoding step, a parameter applied before decoding the code.

According to the present invention, it is possible to quickly and accurately support a change of a parameter beyond the user administrator authority without the user knowing the parameter.

BRIEF DESCRIPTION OF DRAWINGS

FIG. 5 is a display example of a parameter setting screen;

FIG. 6 is a display example of a code input screen;

FIG. 7 is an example of a code input sheet;

FIG. 11 is a display example of a code history screen.

DESCRIPTION OF THE INVENTION

Figure 1:
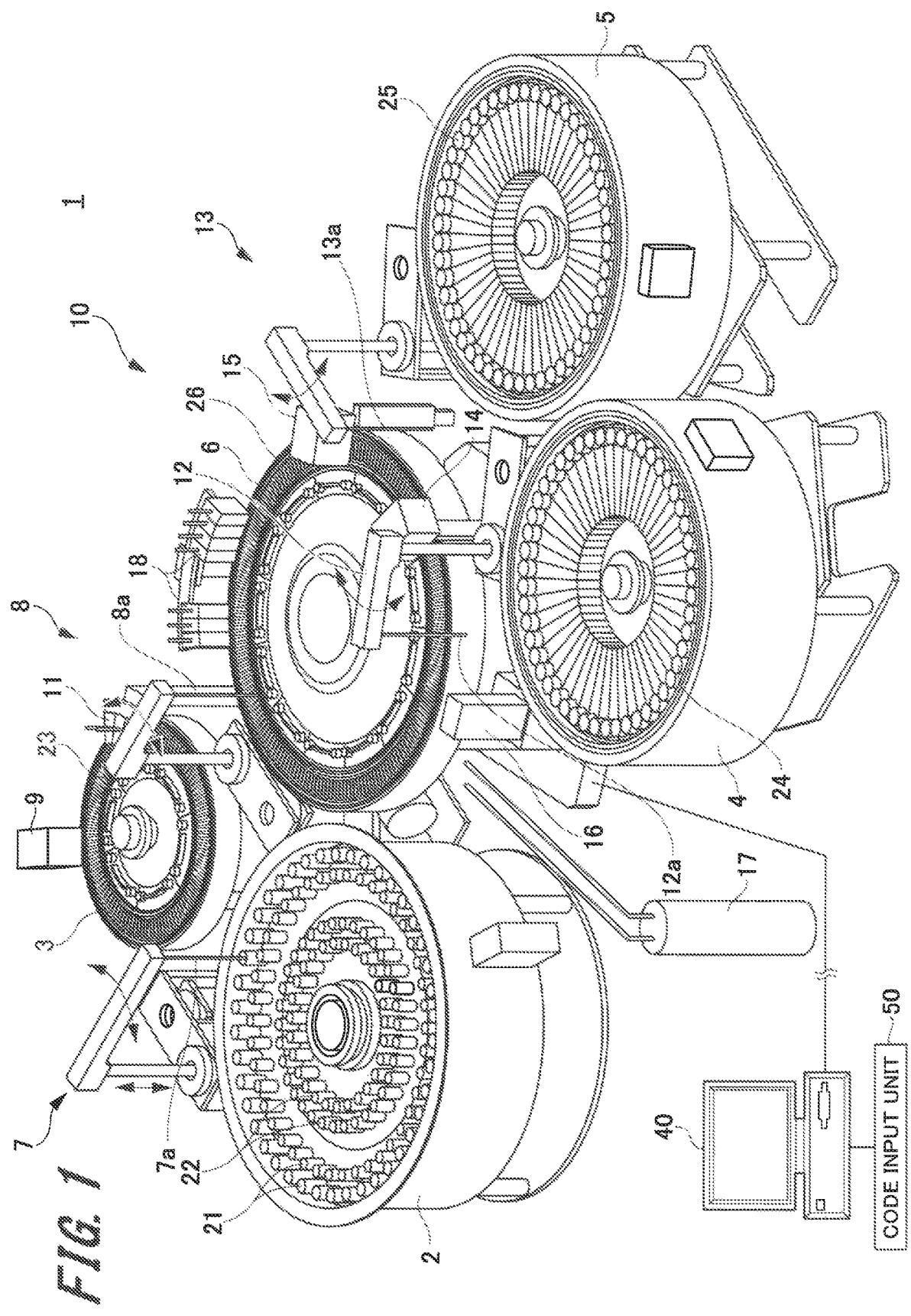
FIG. 1 is a schematic perspective view schematically showing an example of an automatic analyzer according to an embodiment of the present invention.

Hereinafter, an embodiment of the present invention will be described in detail with reference to the drawings. In the present specification and drawings, components having substantially the same function or configuration are given the same reference numerals to omit duplicate description.

<Configuration of Automatic Analyzer>

FIG. 1 is a schematic perspective view schematically showing an example of an automatic analyzer according to the embodiment of the present invention.

The embodiment of the present invention will describe a biochemical analyzer as an example of the automatic analyzer. However, the automatic analyzer according to the present invention may be applied to an analyzer other than the biochemical analyzer. The biochemical analyzer is a device that analyzes biological components contained in a sample, such as blood and urine.

As shown in FIG. 1, an automatic analyzer 1 includes a measuring unit 10 that measures a sample, a control device 40, and a code input unit 50. The measuring unit 10 includes a sample turntable 2, a dilution turntable 3, a first reagent chamber housing unit 4, a second reagent chamber housing unit 5, and a reaction turntable 6. Further, the measuring unit 10 includes a sample dilution unit 7, a sampling unit 8, a dilution stirrer 9, a dilution cleaner 11, a first dispenser 12, a second dispenser 13, a first reaction stirrer 14, a second reaction stirrer 15, a multi-wavelength photometer 16, a constant temperature bath 17, and a reaction chamber cleaner 18.

The sample turntable 2 is formed in a shape of a chamber having a substantially cylindrical shape with one open end in the axial direction. The sample turntable 2 contains a plurality of sample chambers 21 and a plurality of diluent chambers 22. Each of the sample chambers 21 is a chamber for storing a sample, such as blood, urine, and serum. Each of the diluent chambers 22 is a chamber for containing a special diluent other than physiological saline, i.e., an ordinary diluent.

The plurality of sample chambers 21 are arranged side by side at predetermined intervals in the circumferential direction of the sample turntable 2. Further, the plurality of sample chambers 21 are set in two rows at predetermined intervals in the radial direction of the sample turntable 2.

The plurality of diluent chambers 22 are arranged on the inner side of the plurality of sample chambers 21 in the radial direction of the sample turntable 2. The plurality of diluent chambers 22 are arranged side by side at predetermined intervals in the circumferential direction of the sample turntable 2. Further, the plurality of diluent chambers 22 are set in two rows at predetermined intervals in the radial direction of the sample turntable 2.

The arrangement of the plurality of sample chambers 21 in the radial direction of the sample turntable 2 is not limited to two rows, and may be one row or three or more rows. This point is the same for the plurality of diluent chambers 22.

The sample turntable 2 is rotatably supported in the circumferential direction by a drive mechanism (not shown). The drive mechanism (not shown) rotates the sample turntable 2 at a predetermined speed in a predetermined angular range in the circumferential direction.

The dilution turntable 3 is arranged in a periphery of the sample turntable 2. Similar to the sample turntable 2, the dilution turntable 3 is formed in a shape of a chamber having a substantially cylindrical shape with one open end in the axial direction. Further, the dilution turntable 3 is rotatably supported in the circumferential direction by a drive mechanism (not shown), and the drive mechanism rotates the dilution turntable 3 at a predetermined speed in a predetermined angle range in the circumferential direction.

The dilution turntable 3 houses a plurality of dilution chambers 23. The dilution chambers 23 are arranged side by side in the circumferential direction of the dilution turntable 3. Each of the dilution chambers 23 contains a diluted sample. The diluted sample is a sample that is sucked from the sample chamber 21 and diluted.

A plurality of first reagent chambers 24 are housed in the first reagent chamber housing unit 4. The plurality of first reagent chambers 24 are arranged side by side in the circumferential direction of the first reagent chamber housing unit 4. Each of the first reagent chambers 24 is a chamber for storing a first reagent.

On the other hand, a plurality of second reagent chambers 25 are housed in the second reagent chamber housing unit 5. The plurality of second reagent chambers 25 are arranged side by side in the circumferential direction of the second reagent chamber housing unit 5. Each of the second reagent chambers 25 is a chamber for storing a second reagent.

The reaction turntable 6 is arranged in a periphery of the sample turntable 2 and the dilution turntable 3. More specifically, the reaction turntable 6 is arranged in a space surrounded by the sample turntable 2, the dilution turntable 3, the first reagent chamber housing unit 4, and the second reagent chamber housing unit 5. Similar to the sample turntable 2, the reaction turntable 6 is formed in a shape of a chamber having a substantially cylindrical shape with one open end in the axial direction. Further, the reaction turntable 6 is rotatably supported in the circumferential direction by a drive mechanism (not shown), and the drive mechanism rotates the reaction turntable 6 at a predetermined speed in a predetermined angle range in the circumferential direction.

The reaction turntable 6 houses a plurality of reaction chambers 26. The plurality of reaction chambers 26 are arranged side by side in the circumferential direction of the reaction turntable 6. The diluted sample sampled from the dilution chamber 23, the first reagent sampled from the first reagent chamber 24, and the second reagent sampled from the second reagent chamber 25 are injected into the reaction chamber 26. Then, in the reaction chamber 26, the diluted sample, the first reagent, and the second reagent are stirred to carry out reaction.

The sample dilution unit 7 is arranged in a vicinity of the sample turntable 2 and the dilution turntable 3. The sample dilution unit 7 includes a dilution dispensing probe 7a. The dilution dispensing probe 7a is supported by a first drive part (not shown) so as to be movable in the vertical direction, which is the axial direction of the sample turntable 2 and the dilution turntable 3. Further, the dilution dispensing probe 7a is rotatably supported in a direction substantially parallel to the openings of the sample turntable 2 and the dilution turntable 3, which is the horizontal direction. The dilution dispensing probe 7a is configured to reciprocate between the sample turntable 2 and the dilution turntable 3 by rotation in the horizontal direction. When the dilution dispensing probe 7a moves between the sample turntable 2 and the dilution turntable 3, the dilution dispensing probe 7a passes through a cleaner (not shown).

Here, the operation of the dilution dispensing probe 7a of the sample dilution unit 7 will be described. First, the dilution dispensing probe 7a of the sample dilution unit 7 moves to a predetermined position above the opening of the sample turntable 2. The dilution dispensing probe 7a then descends in the axial direction of the sample turntable 2. As a result, a tip end (lower end) portion of the dilution dispensing probe 7a is inserted into the sample chamber 21. At this point, the dilution dispensing probe 7a sucks the sample contained in the sample chamber 21 for a predetermined amount by operating a pump (not shown). Next, the dilution dispensing probe 7a elevates in the axial direction of the sample turntable 2. As a result, the tip end (lower end) portion of the dilution dispensing probe 7a is pulled up from the inside of the sample chamber 21.

Next, the dilution dispensing probe 7a moves to a predetermined position above the opening of the dilution turntable 3 by rotating the dilution dispensing probe 7a for a predetermined amount in the horizontal direction. The dilution dispensing probe 7a then descends in the axial direction of the dilution turntable 3. As a result, the tip end portion of the dilution dispensing probe 7a is inserted into a predetermined dilution chamber 23. In this state, the dilution dispensing probe 7a dispenses the sample sucked earlier and a predetermined amount of the diluent (for example, physiological saline) supplied from the sample dilution unit 7 itself into the dilution chamber 23. As a result, in the dilution chamber 23, the sample is diluted to a predetermined multiple of a concentration to generate the diluted sample. Then, the cleaner cleans the dilution dispensing probe 7a.

The sampling unit 8 is arranged between the dilution turntable 3 and the reaction turntable 6. The sampling unit 8 includes a sampling dispensing probe 8a. The sampling dispensing probe 8a is supported by a second drive part (not shown) so as to be movable in the vertical direction, which is the axial direction of the dilution turntable 3 and the reaction turntable 6. Further, the sampling dispensing probe 8a is rotatably supported in a direction substantially parallel to the openings of the dilution turntable 3 and the reaction turntable 6, which is the horizontal direction. The sampling dispensing probe 8a is configured to reciprocate between the dilution turntable 3 and the reaction turntable 6 by rotation in the horizontal direction.

The sampling dispensing probe 8a sucks the diluted sample from the dilution chamber 23 set in the dilution turntable 3, and dispenses the sucked diluted sample into the reaction chamber 26 set in the reaction turntable 6. When the diluted sample is sucked from the dilution chamber 23, a tip end portion of the sampling dispensing probe 8a is inserted into the dilution chamber 23. When the diluted sample is dispensed into the reaction chamber 26, the tip end portion of the sampling dispensing probe 8a is inserted into the reaction chamber 26.

The first dispenser 12 is arranged between the first reagent chamber housing unit 4 and the reaction turntable 6. The first dispenser 12 includes a first dispensing probe 12a. The first dispensing probe 12a is supported by a third drive part (not shown) so as to be movable in the vertical direction, which is the axial direction of the reaction turntable 6. Further, the first dispensing probe 12a is rotatably supported in a direction substantially parallel to the opening of the reaction turntable 6, which is the horizontal direction. The first dispensing probe 12a is configured to reciprocate between the first reagent chamber housing unit 4 and the reaction turntable 6 by rotation in the horizontal direction.

The first dispensing probe 12a sucks the first reagent from the first reagent chamber 24 set in the first reagent chamber housing unit 4, and the sucked first reagent is dispensed into the reaction chamber 26 set in the reaction turntable 6. When the first reagent is sucked from the first reagent chamber 24, a tip end portion of the first dispensing probe 12a is inserted into the first reagent chamber 24. When the first reagent is dispensed into the reaction chamber 26, the tip end portion of the first dispensing probe 12a is inserted into the reaction chamber 26.

The second dispenser 13 is arranged between the second reagent chamber housing unit 5 and the reaction turntable 6. The second dispenser 13 includes a second dispensing probe 13a. The second dispensing probe 13a is supported by a fourth drive part (not shown) so as to be movable in the vertical direction, which is the axial direction of the reaction turntable 6. Further, the second dispensing probe 13a is rotatably supported in a direction substantially parallel to the opening of the reaction turntable 6, which is the horizontal direction. The second dispensing probe 13a is configured to reciprocate between the second reagent chamber housing unit 5 and the reaction turntable 6 by rotation in the horizontal direction.

The second dispensing probe 13a sucks the second reagent from the second reagent chamber 25 set in the second reagent chamber housing unit 5, and the sucked second reagent is dispensed into the reaction chamber 26 set in the reaction turntable 6. When the second reagent is sucked from the second reagent chamber 25, a tip end portion of the second dispensing probe 13a is inserted into the second reagent chamber 25. When the second reagent is dispensed into the reaction chamber 26, the tip end portion of the second dispensing probe 13a is inserted into the reaction chamber 26.

The dilution stirrer 9 is in a periphery of the dilution turntable 3. The dilution stirrer 9 includes a stirring element (not shown). The stirring element is inserted into the dilution chamber 23 to stir the sample and the diluent contained therein.

The dilution cleaner 11 is arranged in a periphery of the dilution turntable 3 together with the aforementioned dilution stirrer 9. The dilution cleaner 11 cleans the dilution chamber 23 after the diluted sample is sucked by the sampling unit 8. The dilution cleaner 11 has a plurality of dilution chamber cleaning nozzles (not shown). The plurality of dilution chamber cleaning nozzles are connected to a waste liquid pump (not shown) and a detergent pump (not shown).

The dilution cleaner 11 cleans the dilution chamber 23 in a cleaning process according to the following procedure.

First, the dilution cleaner 11 inserts each of the dilution chamber cleaning nozzles into the dilution chamber 23 and drives the waste liquid pump so that the diluted sample remaining in the dilution chamber 23 is sucked by the dilution chamber cleaning nozzle. Further, the dilution cleaner 11 discharges the diluted sample sucked by the dilution chamber cleaning nozzle to a waste liquid tank (not shown).

Next, the dilution cleaner 11 supplies a detergent to the dilution chamber cleaning nozzle by driving the detergent pump, and dispenses the supplied detergent from the dilution chamber cleaning nozzle into the dilution chamber 23. The inside of the dilution chamber 23 is cleaned by dispensing this detergent. After that, the dilution cleaner 11 sucks the detergent remaining in the dilution chamber 23 with the dilution chamber cleaning nozzle, and then dries the inside of the dilution chamber 23. This completes cleaning of the dilution chamber 23.

The first reaction stirrer 14, the second reaction stirrer 15, and the reaction chamber cleaner 18 are arranged around the reaction turntable 6. The first reaction stirrer 14 has a stirring element (not shown), and this stirring element is inserted into the reaction chamber 26 to stir the diluted sample and the first reagent. As a result, reaction between the diluted sample and the first reagent is carried out uniformly and rapidly. The configuration of the first reaction stirrer 14 is the same as the configuration of the dilution stirrer 9. Therefore, the description of the configuration of the first reaction stirrer 14 will be omitted.

The second reaction stirrer 15 has a stirring element (not shown), and this stirring element is inserted into the reaction chamber 26 to stir the diluted sample, the first reagent, and the second reagent. As a result, reaction of the diluted sample with the first reagent and the second reagent is carried out uniformly and rapidly. The configuration of the second reaction stirrer 15 is the same as the configuration of the dilution stirrer 9. Therefore, the description of the configuration of the second reaction stirrer 15 will be omitted.

The multi-wavelength photometer 16 is arranged in a periphery of the reaction turntable 6 so as to face an outer wall of the reaction turntable 6. The multi-wavelength photometer 16 performs optical measurement of the diluted sample injected into the reaction chamber 26 and reacted with the first reagent and the second reagent. The multi-wavelength photometer 16 is a photometer for detecting a reaction state of the diluted sample, and outputs numerical data called "absorbance" obtained by detecting (measuring) the diluted sample. Since the numerical data of absorbance output by the multi-wavelength photometer 16 changes according to an amount of each of various components in the sample, the amount of each component can be obtained from this numerical data.

The constant temperature bath 17 keeps the reaction chamber 26 set in the reaction turntable 6 at a constant temperature. As a result, the liquid contained in the reaction chamber 26 is maintained at the constant temperature.

The reaction chamber cleaner 18 is a device for cleaning the inside of the reaction chamber 26 for which the inspection has been completed. The reaction chamber cleaner 18 has a plurality of reaction chamber cleaning nozzles (not shown). The plurality of reaction chamber cleaning nozzles are connected to the waste liquid pump (not shown) and the detergent pump (not shown), similarly to the aforementioned dilution chamber cleaning nozzle. A cleaning process of the reaction chamber 26 by the reaction chamber cleaner 18 is the same as the cleaning process of the dilution chamber 23 by the dilution cleaner 11 described above, except that a cleaning target is different. Therefore, the description of the cleaning process of the reaction chamber 26 by the reaction chamber cleaner 18 will be omitted.

Figures 2, 3:
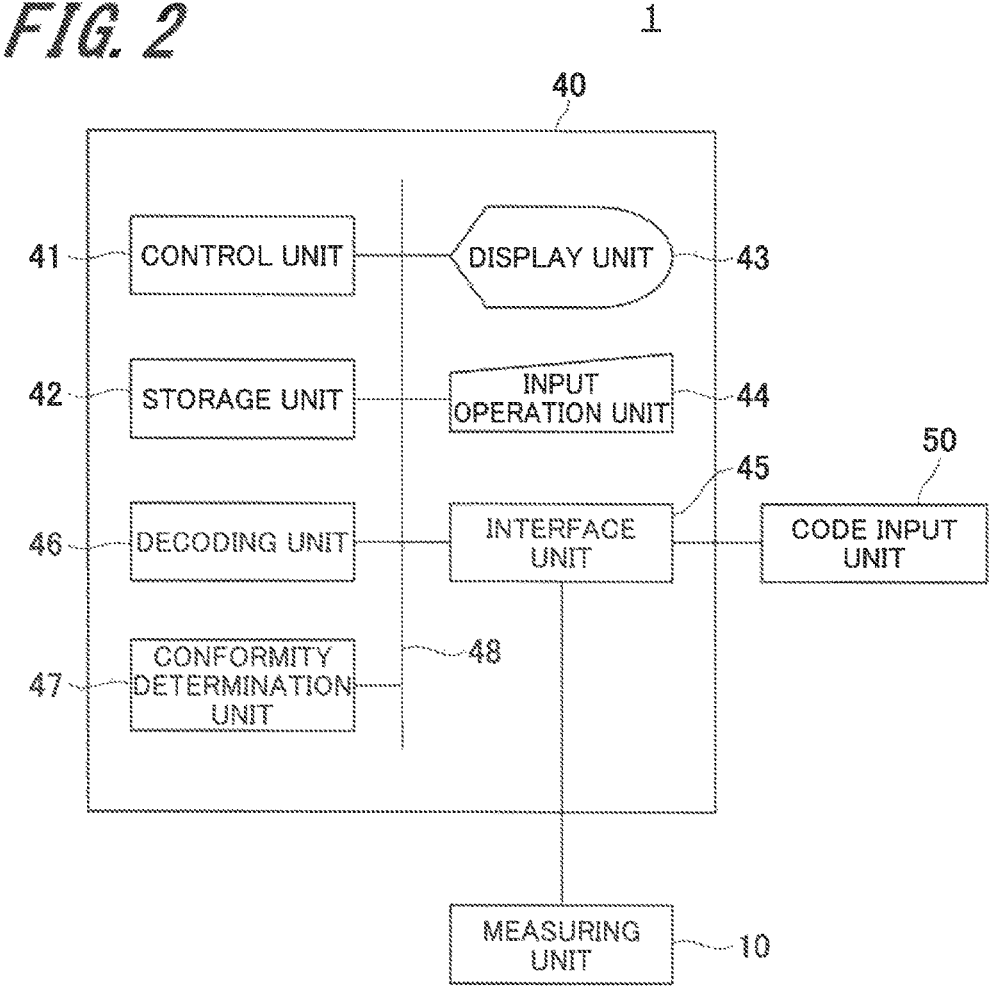
FIG. 2 is a block diagram showing an example of a configuration of a control system of the automatic analyzer according to the embodiment of the present invention.
FIG. 3 is an example of elements (information) included in an encoded code.

FIG. 2 is a block diagram showing an example of a control system configuration of the automatic analyzer according to the embodiment of the present invention.

As shown in FIG. 2, the control device 40 is a computer equipped with a control unit 41, a storage unit 42, a display unit 43, an input operation unit 44, an interface unit 45, a decoding unit 46, a conformity determination unit 47, and a bus 48 that connects the units (41 to 47) to each other. The measuring unit 10 and the code input unit 50 are electrically connected to the control device 40 via the interface unit 45.

The control unit 41 has, for example, a central processing unit (CPU), a read only memory (ROM) that stores programs executed by the CPU, and a random access memory (RAM) used as a work area of the CPU. The CPU executes a program read from the ROM to the RAM so that the control unit 41 controls processes and operations of the entire automatic analyzer 1, including the measuring unit 10. Further, the control unit 41 sets or updates various parameters set for the automatic analyzer 1 and used for a measurement process or a maintenance process of the measuring unit 10. Updates of parameters include adding parameters as well as changing parameters. The parameters are used for accepting an operator's operation or controlling the operation of the measuring unit 10.

The storage unit 42 is configured with, for example, a non-volatile semiconductor memory (so-called flash memory), a hard disk drive (HDD), a solid state drive (SSD), and the like. The storage unit 42 stores various kinds of electronic information, such as data and parameters, that the control unit 41 refers to for controlling processes and operations of the automatic analyzer 1. Data stored in the storage unit 42 includes data used for various processes performed by the measuring unit 10, such as measurement for biochemical analysis and maintenance. Further, the data stored in the storage unit 42 includes operation information of the device itself (automatic analyzer 1).

The operation information is information applied to the current operation (process and operation) of the automatic analyzer 1. The operation information is at least one of device information related to the device itself and environmental information related to the device itself. The device information includes at least one of code identification information, automatic analyzer 1 model information, automatic analyzer 1 identification information, software version information, and code expiration date information. The environmental information includes information on a place where the automatic analyzer 1 is installed, such as a country name and a region name, and information such as a date in the place (country, region, etc.) where the automatic analyzer 1 is installed. This embodiment describes an example of a case where the operation information is the device information, and the device information includes all of the code identification information, automatic analyzer 1 model information, automatic analyzer 1 identification information, software version information, and code expiration date information.

The display unit 43 is configured with a liquid crystal display (LCD), an organic electro luminescence (EL) display, or the like. The display unit 43 displays measurement data obtained through measurement by the measuring unit 10, an analysis result based on the measurement data, and the like. Further, the display unit 43 displays various screens, including a range of setting screens and operation screens, a status screen showing the status of the measuring unit 10, and an alarm screen including errors and warnings.

The input operation unit 44 is a section operated by an operator to input various types of data to the automatic analyzer 1. The input operation unit 44 is configured with, for example, a mouse, a keyboard, a touch panel, and the like. Data input by the input operation unit 44 is taken into the control unit 41 and also stored in the storage unit 42 as required.

The interface unit 45 receives various kinds of data output from the measuring unit 10 and sends the received data to the control unit 41. Data output from the measuring unit 10 includes measurement data obtained through measurement by the measuring unit 10. Further, the interface unit 45 receives various kinds of data from the control unit 41 and sends the received data to the measuring unit 10. In this way, the interface unit 45 passes data between the control unit 41 and the measuring unit 10 so that the control unit 41 can control the operation of each part of the measuring unit 10.

The decoding unit 46 is a section that decodes a code (hereinafter, also referred to as an "input code") input by the code input unit 50 described later. Further, the decoding unit 46 converts the code encoded by a predetermined coding method, such as the Base64 method, into binary data by decoding the code using the same method. To decode the encoded code, other methods, such as uuencode and Ascii85, may be adopted. Further, when the input code is encrypted, the decoding unit 46 decodes the input code using an encryption key. A reason for encrypting the input code is as follows. First, the parameters set in the automatic analyzer 1 affect the reliability and safety of the device itself. Therefore, if the code to be encoded is easily deciphered by a third party, the parameters may be changed by the third party, which may impair the reliability of the automatic analyzer 1. Therefore, in order to prevent falsification or fabrication of the code to be encoded and to prevent the code from being easily deciphered by the third party, it is preferable to encrypt the input code. In this embodiment, it is assumed that the input code is encrypted. As an encryption method, for example, a common key cryptosystem or a public key cryptosystem can be adopted, but the present invention is not limited to this. Other encryption methods may be adopted.

The conformity determination unit 47 is a functional section realized by a computer hardware resource, such as CPU, ROM, and RAM. The conformity determination unit 47 determines whether or not code applicable condition information generated through decoding of the input code by the decoding unit 46 conforms to the operation information. A specific determination method will be described in detail later.

The code input unit 50 is a section for inputting an encoded code. When the encoded code is, for example, a one-dimensional code (bar code) or a two-dimensional code (QR code), the code input unit 50 is configured with a code input device that reads these codes, such as a bar code reader and a QR code reader. The code input device may be a hand-held type or a built-in type. Another example of the encoded code and the code input device that reads the code is that the encoded code is a character and the code input device that reads the code is an optical character recognition (OCR) reader. In this embodiment, as an example, the code input unit 50 is configured with a hand-held QR code reader. The QR code, which is an example of the input code, contains information on the elements shown in FIG. 3.

Next, the encoded code will be described in detail.

The encoded code contains information on the elements shown in FIG. 3, and is encoded character string data or image data of the code generated by using error detection and encryption technology, such as Cyclic Redundancy Check (CRC). Examples of a code converted into image data are a barcode and QR code. As shown in FIG. 3, the elements contained in the encoded code are a code identifier, model, issue source, issue ID, expiration date, machine number (serial, specific operation system information), applicable condition (version range, option), updating data table, parameter address (No., ID, etc.), parameter value, and command (function).

Each of the elements of the updating data table, parameter address, parameter value, and command has a plurality of pieces of information, and other elements have a single piece of information. The updating data table, parameter address, and parameter value correspond to parameter information related to sample measurement. The parameter information related to sample measurement means the information on parameters having some kind of relation to the operation of the measuring unit 10 that measures the sample, such as parameters applied to the operation control of the measuring unit 10. Further, the operation of the measuring unit 10 includes not only the measurement operation performed for analysis of the sample, but also the maintenance operation performed for maintaining and managing the automatic analyzer 1. Further, the updating data table and the parameter address correspond to specific information for specifying a parameter to be updated based on the parameter information, and the command (function) corresponds to command information. The command (function) is a command for executing the function of the automatic analyzer 1, and a content of a process executed by this command is defined in advance in the control device 40. The parameter and resource data are read from the storage unit 42 and used as necessary when the input operation unit 44 accepts the operator's operation or when the measurement operation of the measuring unit 10 is controlled. Therefore, the specific information is information that can identify in which area the parameters are stored (saved) in a storage area of the storage unit 42. The specific information may be any information as long as the parameters to be updated can be identified.

An example of the data tables of parameters and resource data is described below.
    a. System parameter
    b. Teaching parameter
    c. Operational parameter
    d. Measurement parameter for each analysis item
    e. Communication parameter
    f. Security parameter
    g. Account parameter
    h. Maintenance parameter
    i. Character string resource
    j. Software Of these, the character string resource and software are both resource data, and others are parameters.

At least one parameter value is set and registered in the data table of each parameter described above. Normally, a plurality of parameter values are set and registered in the data table of one parameter. For example, in the system parameter data table, a plurality of parameter values (see FIG. 5) are set and registered, and parameter values that specify the number of checks of various sensors are included in the data table. In addition, a plurality of parameter values are set and registered in a measurement parameter data table for each analysis item, and parameter values for determining a dispensing amount of the reagent are included in the data table.

Further, among the plurality of elements (information) shown in FIG. 3, the code identifier corresponds to the code identification information, and the model corresponds to the model information of the automatic analyzer 1. The expiration date corresponds to the code expiration date information, and the applicable condition corresponds to the software version information. These elements belong to the code applicable condition information. The code applicable condition information is information for determining whether or not the parameter information contained in the encoded code can be applied. The code applicable condition information may be one or more of the code identifier, model, expiration date, machine number, and applicable condition. In this embodiment, as an example, it is assumed that the code applicable condition information includes all of the code identifier, model, expiration date, machine number, and applicable condition.

The code input unit 50 can be used not only for updating the parameters, but also for reading barcodes or QR codes attached to sample chambers, reagent chambers, consumables, and the like. Further, the code input unit 50 executes a process of converting the input signal obtained by reading the encoded code with a laser light receiving sensor or a CCD camera equipped in the code input unit 50 into character information (character data), and transmits this conversion process result to the control unit 41 via the interface unit 45. The conversion process by the code input unit 50 includes a process of identifying a code type, a confirmation process by a check digit, a restoration process of correcting an error, and the like.

Figure 4:
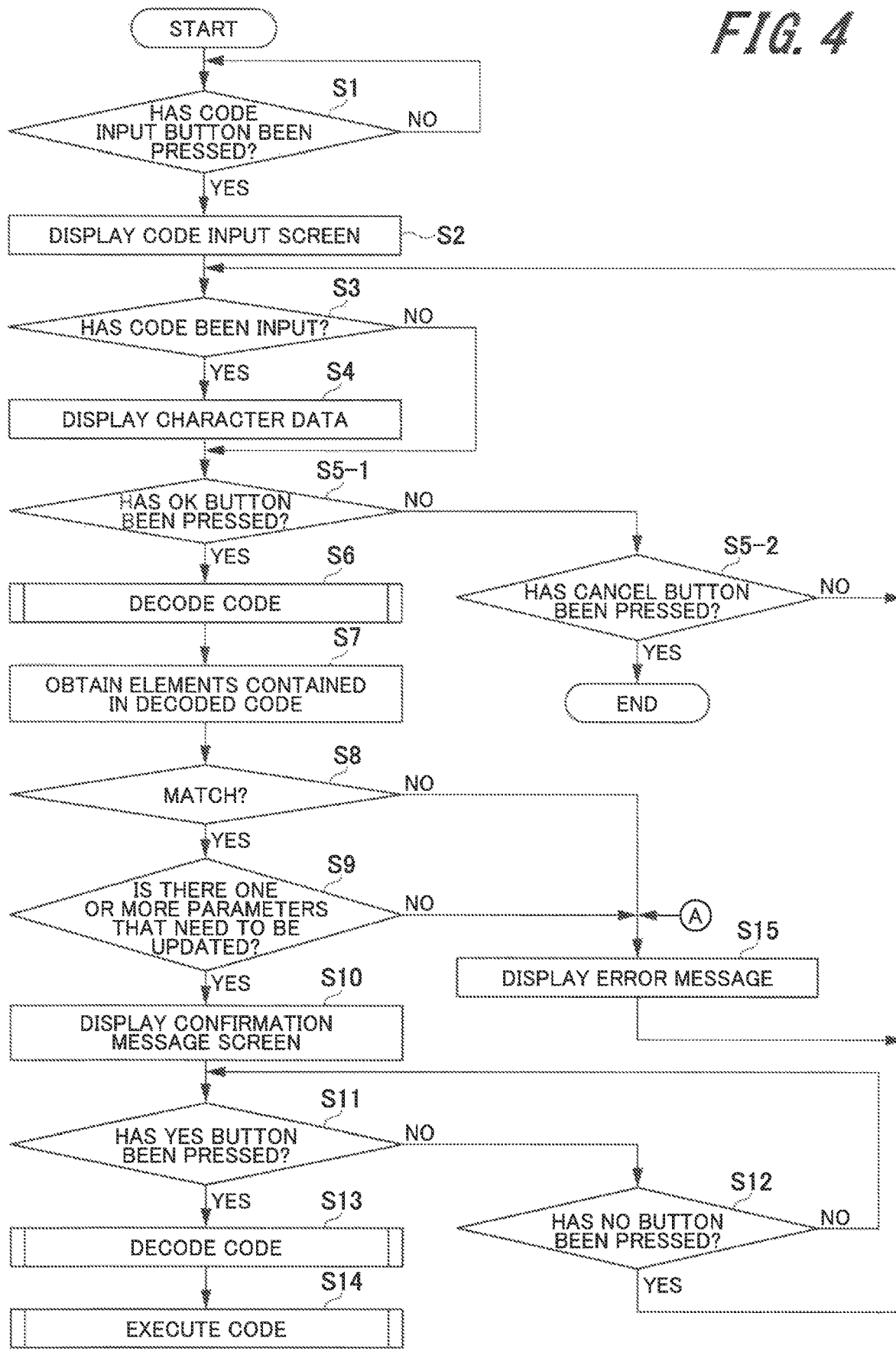
FIG. 4 is a flowchart showing an example of processing performed by the automatic analyzer according to the embodiment of the present invention.

FIG. 4 is a flowchart showing an example of a process performed by the automatic analyzer 1 according to the embodiment of the present invention. An example of the process related to parameter update will be described below.

First, the control unit 41 confirms whether or not a code input button on the parameter setting screen displayed on the display unit 43 has been pressed (step S1). When the control unit 41 determines that the code input button has been pressed, the process proceeds to step S2. To display the parameter setting screen on the display unit 43, a user, in advance, logs in to a system of the automatic analyzer 1 with user administrator authority (manager authority) or service authority to perform a predetermined operation.

FIG. 5 is a display example of the parameter setting screen. Note that FIG. 5 shows a setting screen for the system parameter, which is one of various parameters. Further, FIG. 5 shows the display example when the parameter setting screen is opened with the service authority. When the parameter setting screen is opened with the user administrator authority, a display part related to a parameter that the user is not allowed to refer to or change is masked (hidden) on the screen. Therefore, a parameter not desirable to be informed to the user can be hidden so that the third party including the user cannot see such a parameter. A range of parameters that an operator can change depends on the authority that the operator has. This authority is roughly divided into the service authority and the user administrator authority, and the service authority has a wider range of parameters that can be changed. There are two main reasons. The first reason is that it may become difficult to ensure reliability of the automatic analyzer 1 when a person other than a service staff changes parameters related to performance and functions of the automatic analyzer 1, while the service staff has knowledge about the automatic analyzer 1 and the repair technique. The second reason is that many of the parameters set in the automatic analyzer 1 are related to technologies and know-how that the manufacturer of the automatic analyzer 1, a reagent manufacturer of the reagent supplied to the manufacturer, or a third party such as OEM does not want the user or a competitor of the automatic analyzer 1 to know.

As shown in FIG. 5, the parameter setting screen is provided with columns for "section", "No.", "parameter name", "access", "set value", "default value", and "comment". Further, the parameter setting screen is provided with a "code input" button 51. The "section" column is a column for displaying the section assigned to the parameter (biochemical unit in the diagram), and the "No." column is a column for displaying an identification number assigned to the parameter. The "section" and "No." configure a parameter address. Further, the "parameter name" column is a column for displaying a parameter name, and the "access" column is a column for setting an access level of each parameter. In addition, the "set value" column is a column for displaying a value of the parameter currently set, and the "default value" column is a column for displaying a value of the parameter set by default. The "comment" column is a column for displaying a comment related to setting of the parameter. The "code input" button 51 is a button pressed by the operator to input an encoded code. The "code input" button 51 is displayed in both cases where the parameter setting screen is opened with the user administrator authority and the service authority.

The operator who wishes to update (change, add, etc.) the parameter presses the "code input" button 51 displayed on the parameter setting screen, for example, by clicking the mouse. Then, in step S1, the control unit 41 determines it as YES.

Next, in step S2, the control unit 41 causes the display unit 43 to display the code input screen.

FIG. 6 is a display example of the code input screen.

As shown in FIG. 6, the code input screen 52 is provided with an edit area 53, an "OK" button 54, a "cancel" button 55, and a "history" button 56. The edit area 53 is an area for displaying the character data converted by the QR code reader or editing the character data when the QR code is read by the QR code reader. The character data displayed in the edit area 53 can be edited by the operator operating a keyboard or the like. The "OK" button 54 is a button pressed by the operator after a code input work is completed. The "cancel" button 55 is a button pressed by the operator to cancel the code input. The "history" button 56 is a button pressed by the operator to check an update history of the code.

Next, the control unit 41 confirms whether or not a code has been input (step S3). The code is input by the operator using the code input unit 50. Hereinafter, a specific example will be described.

FIG. 7 is an example of a code input sheet.

As shown in FIG. 7, each of the code identifier (code ID), model of the automatic analyzer 1, machine number of the automatic analyzer 1, code expiration date (validity), remarks, and operation procedure are printed with character information on a code input sheet 60. Further, image information of a QR code 61, which is an encoded code, is printed on the code input sheet 60. The code input sheet 60 is prepared at user's hand in a print form. In this case, the manufacturer of the automatic analyzer 1 sends (distributes) electronic data that is the source of the code input sheet 60 to the user via, for example, FAX or e-mail, and the user receiving the electronic data prints the electronic data on a sheet of paper. The electronic data that is the source of the code input sheet 60 is, for example, PDF data or bitmap data.

After obtaining the code input sheet 60, the operator reads the QR code 61 with the QR code reader as the code input unit 50. When the QR code 61 is read by the QR code reader, the QR code reader converts an image of the QR code 61 into character data.

On the other hand, when the control unit 41 detects that the code has been input by the operator, the control unit 41 determines it as YES in step S3, and displays the character data converted by the QR code reader in the edit area 53 on the code input screen 52. (Step S4). When the operator does not input the code, the control unit 41 skips the process in step S4 and proceeds to step S5-1.

In step S5-1, the control unit 41 confirms whether or not the "OK" button 54 on the code input screen 52 has been pressed. Then, when the "OK" button 54 has been pressed, the control unit 41 proceeds the process to step S6. When the "OK" button 54 is not pressed, the process proceeds to step S5-2. In step S5-2, the control unit 41 confirms whether or not the "cancel" button 55 has been pressed. Then, when the "cancel" button 55 has been pressed, the process ends as it is. When the "cancel" button 55 is not pressed, the process returns to step S3.

On the other hand, in step S6, the decoding unit 46 executes a process of decoding the input code (hereinafter, referred to as "decoding process"). The decoding process is executed by the decoding unit 46 in response to a command from the control unit 41. When the decoding unit 46 executes the decoding process, the elements included in the input code (see FIG. 3) are stored in the RAM or the storage unit 42 as binary data that can be processed by the computer.

Figure 8:
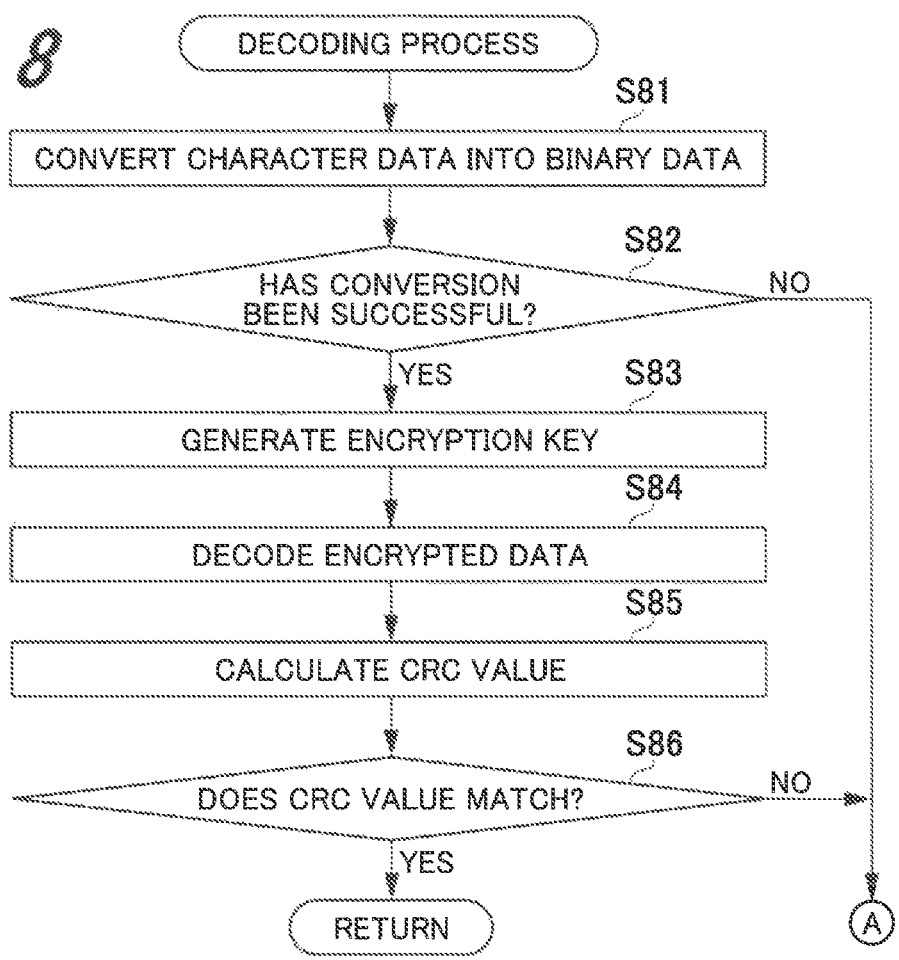
FIG. 8 is a flowchart showing an example of a decoding process.

FIG. 8 is a flowchart showing an example of the decoding process.

First, the decoding unit 46 converts the character data indicating each element contained in the input code into binary data (step S81). With respect to a data conversion method, for example, when the character data indicating each element of the input code is encoded by a method, such as Base64 or Axcii85, the character data is converted into binary data by a corresponding method.

Next, the decoding unit 46 determines whether or not data conversion in step S81 has been successful (step S82). Then, when the data conversion has been successful, the process proceeds to next step S83. When the data conversion has failed, the process proceeds to step S15 in the process flow in FIG. 4. In step S15, the control unit 41 displays an error message on the display unit 43. The content of the error message differs by error. When the data conversion in step S81 fails, the control unit 41 displays the error message "This code cannot be used" on the display unit 43.

In step S83, the decoding unit 46 generates an encryption key. Here, the decoding unit 46 generates the encryption key by arithmetic operation every time, based on the aforementioned operation information and the binary data converted in the aforementioned step S81. In the operation for generating the encryption key, the decoding unit 46 executes a predetermined process by combining computer arithmetic operation, such as addition, subtraction, AND, OR, arithmetic shift, rotation, and inversion. Next, the decoding unit 46 decodes encrypted data (encrypted input code) using the encryption key (step S84).

Next, the decoding unit 46 calculates a Cyclic Redundancy Check (CRC) value from a data part obtained by the decoding process in step S84 above (step S85). Next, the decoding unit 46 confirms whether or not the CRC value calculated in step S85 matches a CRC value embedded as auxiliary information in the input code (step S86). When the CRC values match, the process proceeds to step S7 in the process flow in FIG. 4. When the CRC values do not match, the process proceeds to step S15 in the process flow in FIG. 4. When the process proceeds to step S15 because the CRC values do not match, the control unit 41 displays an error message "There is an error in the code" on the display unit 43.

In this embodiment, error detection is performed by the CRC method that can detect a damage to the code read by the code input unit 50 at a certain level. However, the present invention is not limited to this method as long as a damage to the code is detectable. For example, a value by a cryptographic hash function, such as Secure Hash Algorithm 1 (SHA-1) and Message Digest Algorithm 5 (MD5), may be used for the error detection.

In step S7, the control unit 41 obtains the elements contained in the decoded code (see FIG. 3). The elements obtained by the control unit 41 are referred to by the conformity determination unit 47 in next step S8.

In step S8, the conformity determination unit 47 determines whether or not the code identifier, model, expiration date, machine number, and applicable condition in the elements obtained by the control unit 41 match the operation information stored in the storage unit 42. The storage unit 42 stores information applied to the current operation of the automatic analyzer 1 as the operation information, i.e., the code identifier, model, expiration date, machine number, and applicable condition. Therefore, the conformity determination unit 47 checks each element of the code identifier, model, expiration date, machine number, and applicable condition obtained by the control unit 41 against information on the code identifier, model, expiration date, machine number, and applicable condition stored in the storage unit 42 to confirm conformity. Hereinafter, a specific description will be given.

First, as for the code identifier, when the code identifier obtained matches the code identifier included in the operation information, it is determined as consistent. When the code identifiers do not match, it is determined as inconsistent. As for the model, when the obtained model matches the model included in the operation information, it is determined as consistent. When the models do not match, it is determined as inconsistent. Still more, as for the machine number, when the obtained machine number matches the machine number included in the operation information, it is determined as consistent. When the machine numbers do not match, it is determined as inconsistent. Still more, as for the expiration date, when the obtained expiration date is later than the expiration date included in the operation information, it is determined as consistent. Other cases are determined as inconsistent. Still more as for the applicable conditions, when a version range in the applicable condition obtained is wider than the version range in the applicable condition included in the operation information (i.e., new version), it is determined as consistent. Other cases are determined as inconsistent. Then, the conformity determination unit 47 determines YES in step S8 when all of the corresponding elements and information are consistent. When any one set of the corresponding elements are inconsistent, the conformity determination unit 47 determines NO in step S8. In step S8, the case where the conformity determination unit 47 determines YES corresponds to the case where the conformity determination unit 47 determines that the code applicable condition information matches the operation information.

When the conformity determination unit 47 determines YES in step S8, the process proceeds to next step S9, and when the conformity determination unit 47 determines NO in step S8, the process proceeds to step S15. In step S15, the control unit 41 displays an error message on the display unit 43. At this time, the error message displayed on the display unit 43 differs by a conformity determination result in step S8. For example, when the obtained machine number does not match the machine number included in the operation information, the error message "There is an error in the code" or "This code cannot be used" is adopted. Further, when the acquired deadline is earlier than the deadline included in the operation information, the error message indicating "This code has expired" is adopted.

In step S9, the control unit 41 confirms whether or not there is one or more parameters that need to be updated. Specifically, with respect to each of the parameters set in the automatic analyzer 1, the control unit 41 checks whether or not a value of parameter before update identified by the aforementioned specific information is different from a value of the parameter after update based on the parameter information. When there is one or more parameters whose values before and after the update are different, the control unit 41 determines YES in step S9 and the process proceeds to step S10. In other cases, i.e., when there is no parameter that needs to be updated, the control unit 41 determines NO in Step S9 and the process proceeds to step S15. In step S15, the control unit 41 displays an error message, such as "already input", on the display unit 43. As a result, only when the value of the parameter before update and the value of the parameter after update based on the parameter information are different, the control device 40 takes a backup of the value of the parameter before update, and rewrites the value of the parameter before update with the value of the parameter after update in step S96 and step S98 in a code execution process (FIG. 10) described later. Therefore, it is possible to avoid unnecessary decoding process (FIG. 8) and code execution process (FIG. 10), which will be described later, when the parameter does not substantially need to be updated.

In step S10, the control unit 41 displays a confirmation message screen on the display unit 43. The confirmation message screen is a screen for confirming with the operator whether or not to execute the code execution process including parameter update. The code execution process will be described later.

Figure 9:
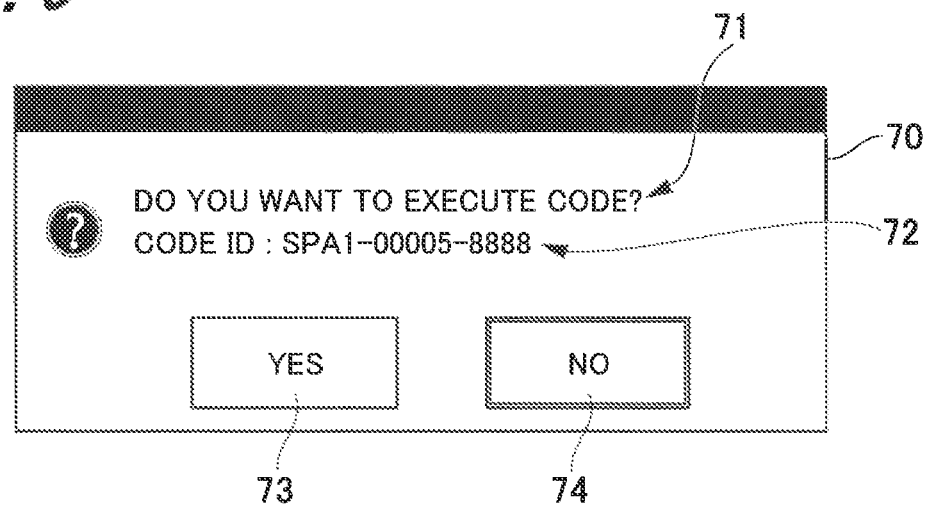
FIG. 9 is a display example of a confirmation message screen.

FIG. 9 is a display example of the confirmation message screen.

As shown in FIG. 9, a confirmation message screen 70 displays a message 71 "Do you want to execute the code?" and a code identifier (code ID) 72. Further, the confirmation message screen 70 is provided with a "Yes" button 73 and a "No" button 74.

When the operator wishes to execute the code (parameter update, etc.), the operator presses the "Yes" button 73, such as by operating the mouse. When the operator does not wish to execute, the operator presses the "No" button 74. Here, the operator visually confirms that the code identifier 72 displayed on the confirmation message screen 70 matches the code identifier (FIG. 7) printed on the code input sheet 60 at the operator's hand, and then press the "Yes" button 73. When the code identifier 72 displayed on the confirmation message screen 70 does not match the code identifier printed on the code input sheet 60, or the operator wishes to cancel the code execution process, the operator presses the "No" button 74.

In response, the control unit 41 confirms whether or not the "Yes" button 73 has been pressed in step S11. When the "Yes" button 73 is not pressed, the control unit 41 confirms whether or not the "No" button 74 has been pressed in step S12. Then, when the control unit 41 determines that the "No" button 74 is not pressed in step S12, the process returns to step S11. When the control unit 41 determines that the "Yes" button 73 has been pressed in step S11, the process proceeds to next step S13. When the control unit 41 determines that the "No" button 74 has been pressed in step S12, the process returns to step S3 above.

In step S13, the decoding unit 46 executes the same decoding process (FIG. 8) as in step S6 above. The decoding process is as described above. The decoding process may be performed using the elements included in the code decoded by the decoding process in step S6. In that case, the decoding process in step S13 can be omitted.

Figure 10:
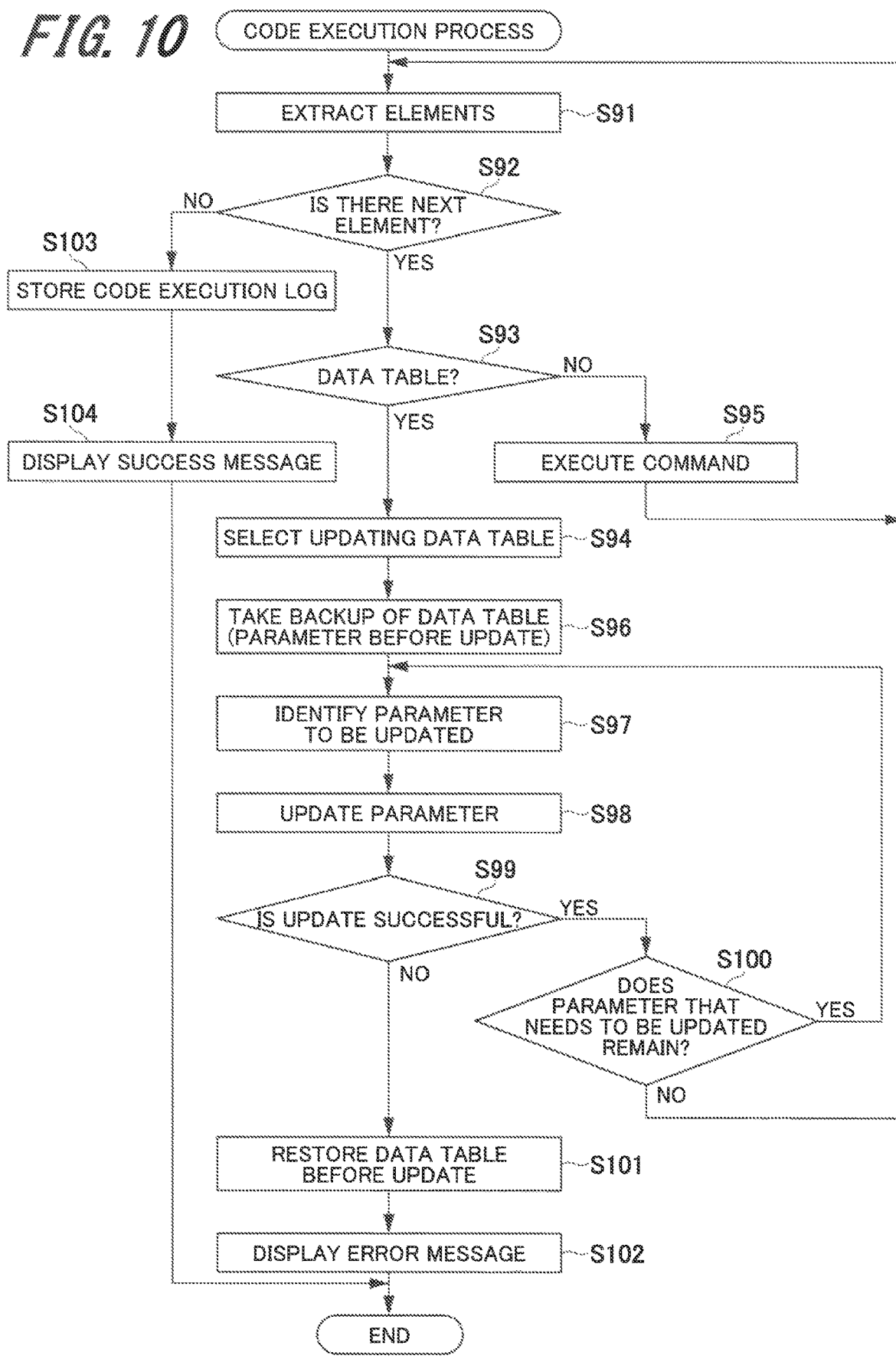
FIG. 10 is a flowchart showing an example of a code execution process.

Next, the control unit 41 performs a process of executing the code (hereinafter, referred to as "code execution process") according to the procedure shown in FIG. 10 (step S14). The code execution process is a process for updating parameters included in the code decoded in step S13 and executing commands included in the code. The code execution process is performed according to the following procedure.

First, the control unit 41 extracts elements included in the code decoded through the decoding process in step S13 above (step S91). The elements included in the decrypted code include plural-value elements (updating data table, parameter address, parameter value, command) and single-value elements (code identifier, model, issuer, issue ID, expiration date, machine number, applicable conditions). Of these, for elements that include plural values are grouped appropriately for a subsequent process.

Next, the control unit 41 confirms whether or not the element to be processed next has been extracted in step S91 above (step S92). Then, when the control unit 41 determines that the element to be processed next has been extracted, the process proceeds to next step S93. When the element to be processed next is not extracted, i.e., all the elements included in the decoded code are extracted, the process proceeds to step S103.

In step S93, the control unit 41 confirms whether or not the element extracted in step S91 above is a data table. Then, when the extracted element is the data table, the control unit 41 determines YES in step S93, and the process proceeds to step S94. When the extracted element is a command instead of the data table, the control unit 41 determines NO in step S93 and the process proceeds to step S95. In step S95, the control unit 41 executes the command, and then the process returns to step S91. When the element extracted in step S91 above is the command, this command (command (function) in FIG. 3) is configured with an execution command ID and a plurality of parameter arguments. The execution command ID is defined in advance inside the control device 40 of the automatic analyzer 1, and the command is executed according to this definition.

Examples of commands are described below.
A. Restart the automatic analyzer.
B. Log in temporarily with the service authority.
C. Display a message designated by the parameter argument.
D. Display a screen designated by the parameter argument.
E. Output a data table designated by the parameter argument to an output destination designated by the parameter argument.

On the other hand, in step S94, the control unit 41 selects an updating data table. The data table selected by the control unit 41 at this point is the updating data table included in the elements extracted in step S91 above.

Next, the control unit 41 takes a backup of the data table selected in step S94 above (step S96). The control unit 41 temporarily stores the updating data table in the storage unit 42 to back up the data table. In the data table, one or more parameters are set (registered). Therefore, taking the backup of the data table in step S96 is equivalent to taking the backup of the parameter before the update. The reason for taking the backup is to enable restoration of the parameter before the update when failing to update the parameter, or when the operator wishes to return to the original state after updating the parameter.

Next, the control unit 41 identifies a parameter to be updated (step S97). At this point, the control unit 41 identifies a parameter to be updated by referring to the specific information (updating data table, parameter address) included in the element extracted in step S91 above. More specifically, the control unit 41 identifies an address of the storage unit 42, in which the parameter to be updated is stored, according to the parameter address included in the element extracted in step S91 above. The interpretation of the parameter address, such as "units such as bytes and records", "offset (starting point)", and "meaning of ID, matrix number, and so on" differs depending on the data table selected. Further, when the parameter update is not a parameter change but a parameter addition, the parameter address is not always necessary because it is not necessary to identify a position (address) of the parameter before the update.

Next, the control unit 41 updates the parameter identified in step S97 above (step S98). At this point, when the parameter update is a parameter change, the control unit 41 rewrites the parameter value before the update stored in the storage unit 42 with a parameter value after the update. As a result, for example, when the parameter to be updated is a "system parameter", the parameter address is "biochemical unit, 809", and the parameter value is "145.0", the parameter set value "150.0" in FIG. 5 is rewritten with "145.0". When the parameter update is a parameter addition, the control unit 41 writes a new parameter value to the predetermined address in the storage unit 42.

Next, the control unit 41 determines whether or not the parameter update is successful (step S99). Then, when the control unit 41 determines that the parameter update is successful (YES in step S99), the control unit 41 confirms whether or not the parameter that needs to be updated remains in the data table selected in step S94 above (Step S100). Then, when the parameter that needs to be updated remains, the control unit 41 returns the process to step S97, and when not to step S91.

On the other hand, when the control unit 41 determines that the parameter update has failed in step S99 (NO in step S99), the control unit 41 restores the data table before the update (step S101). Specifically, the control unit 41 writes the parameter value registered in the data table backed up in step S96 above to the original address (before update) in the storage unit 42 to restore the data table before the update. Restoring the data table before the update means substantially restoring the parameters before the update.

Next, the control unit 41 displays an error message indicating that the parameter update has failed on the display unit 43 (step S102), and then ends the process.

Further, when the determination is NO in step S92 above and the process proceeds to step S103, the control unit 41 stores (saves) a code execution log in the storage unit 42. Next, the control unit 41 displays a message indicating that the parameter update has been successful on the display unit 43 (step S104), and then ends the process.

The code execution log stored in the storage unit 42 in step S103 above includes an execution date and time of the code execution process, the code identifier, changed parameter information, and the like. In addition, changed parameter information includes the parameter ID (identifier), the parameter value before the change, the parameter value after the change, and the like.

The code execution log is read from the storage unit 42 by the control unit 41 when the control unit 41 displays the code history screen on the display unit 43. Specifically, when the operator presses the "history" button 56 on the code input screen 52 shown in FIG. 6 by operating the mouse or the like, the control unit 41 displays, for example, a code history screen 80 as shown in FIG. 11 to the front (upper layer) or side of the code input screen 52.

As shown in FIG. 11, the code history screen 80 displays history information 81 of the code execution process executed in the past. The history information 81 of the code execution process includes the execution date and time of the code execution process, code type and identifier, operator who has performed the operation for the code execution process, code address, and parameter values before and after the change. Further, the code history screen 80 is provided with a "print" button 82 and a "close" button 83. The "print" button 82 is an operation button for accepting printing by the operator of the history information 81 on the code execution process. The operator can print the history information 81 on the code execution process on a sheet of paper by pressing the "print" button 82. The "close" button 83 is an operation button pressed by the operator to close the code history screen 80. The operator can return the display of the display unit 43 to the original state (display of the code input screen 52) by pressing the "close" button 83. Note that FIG. 11 shows the code history screen 80 displayed when the system is logged in with the service authority, and when the system is logged in with the user administrator authority (manager authority), the control unit 41 does not display part of the history information 81. The history information 81 that is not displayed on the code history screen 80 when the system is logged in with the user administrator authority is information that is not allowed to refer to or change by the user administrator authority. Therefore, when the system is logged in with the user administrator authority, for example, the information displayed on the third line from the top of the "Details" column, i.e., information including parameter values before and after the change, will not be displayed on the code history screen 80 shown in FIG. 11.

Effects of the Embodiment

As described above, in the embodiment of the present invention, the code input unit 50 inputs the encoded code, and the decoding unit 46 decodes the input code. Then, the control unit 41 updates the parameter applied before the code is decoded based on the parameter information generated by decoding the code by the decoding unit 46. As a result, it is possible to quickly and accurately support a parameter change beyond the user administrator authority without the user knowing the parameter. Further, since there is no possibility that the user will know the information (ID, password, etc.) for logging in to the system of the automatic analyzer 1 with the service authority, the security of the automatic analyzer 1 can be maintained.

The effects of this embodiment will be described below using specific examples.

Example 1

One of the parameters that can be changed by the service authority is a parameter for turning on (enable) or turning off (disable) a function of a sensor that detects water leaks. If this sensor fails and the operation of the automatic analyzer 1 stops due to malfunction of the sensor, although no water leak has occurred, the user needs to wait until a service staff of the manufacturer comes and repairs the sensor. In such a situation, the manufacturer can send the code input sheet 60 to the user, and the code input sheet 60 can be used to change the parameter to turn off the function of the sensor in failure. As a result, the user can restart the operation of the automatic analyzer 1 without waiting for the arrival of the service staff. Therefore, the operation downtime of the automatic analyzer 1 can be shortened.

Example 2

To change a reagent or consumables used, or to change (or start) the operation or service of a function in the automatic analyzer 1, the software processing itself may not be changed. In this case, it is possible to respond to each change simply by updating the parameters. However, some parameters do not have a user interface, and also some parameters cannot be disclosed due to business reasons. In such a case, it is necessary to apply a new version of the software to the automatic analyzer 1. However, it takes a considerable time to apply the new version, and the operation of the automatic analyzer 1 may have to be stopped. Even in such a situation, according to the automatic analyzer 1 of the embodiment, a new version of the software can be applied to the automatic analyzer 1 without disclosing the parameters. Therefore, the operation downtime of the automatic analyzer 1 can be shortened.

Example 3

When a service staff of a manufacturer who has the service authority changes a parameter that exceeds the user administrator authority by using the service authority, a parameter is, in principle, input manually, such as by the keyboard operation. On the other hand, for example, some hardware units may be replaced due to a failure of the automatic analyzer 1 or a hardware design change including discontinuation of production. In addition, parameter installation values may be changed according to options or regulations in each region. In such a case, since it is necessary to change a large number of parameters, it takes a long time to input the parameters and confirm the parameters after input. In addition, a wrong parameter value may be entered, or a parameter other than the parameter to be changed may be changed. Even in such a situation, according to the automatic analyzer 1 of the present embodiment, the parameters can be changed quickly and accurately.

Example 4

As a method of changing the parameters of the automatic analyzer 1, a terminal on the manufacturer side and the automatic analyzer 1 on the user side are connected in a communicable manner by a network line, and the parameters can be changed using this network line to support parameter changes. When this method is adopted, communication infrastructure equipment that realizes wired or wireless general-purpose network communication is required, and at the same time, security measures are also required. Therefore, adopting the above method is costly and time-consuming to install and maintain. Another method is to support parameter changes using general-purpose medium, such as a CD-ROM. However, it is costly and time-consuming to create and distribute the media. On the other hand, the automatic analyzer 1 of the present embodiment can support parameter changes just by using easily available devices or those that are used on a daily basis, such as the code input sheet 60 that can be distributed using fax, e-mail, or the like, and a personal digital assistant (terminals such as tablets) that can receive fax, e-mail, or the like. In addition, when using the general-purpose media, there is a risk of virus infection or leakage of personal information. However, according to the automatic analyzer 1 of the present embodiment, the parameters can be changed in an offline state separated from the network or the like. Therefore, security-based safety is ensured.

Modified Examples

The technical scope of the present invention is not limited to the above embodiment, and various changes and improvements are made to the extent that a specific effect obtained by the constituent requirements of the invention or a combination of the constituent requirements can be derived.

For example, the above embodiment refers to the case where the QR code 61 printed on the code input sheet 60 is read by the QR code reader, but the present invention is not limited to this. For example, a personal digital assistant, such as a tablet, may be used to display the QR code on the screen, and this QR code may be read by the QR code reader.

In that case, by transmitting electronic data including the encoded code to the personal digital assistant by e-mail, the QR code can be displayed on the screen of the terminal.

Further, the code input unit 50 is not limited to a code input device, such as a code reader. For example, it can be configured such that a communication interface receives and captures a code transmitted to the device itself (automatic analyzer 1) via a network. Further, the code input unit 50 may be configured with an RFID reader that reads the code stored in an RFID tag.

What is claimed is:

1. An automatic analyzer comprising:
   a code input unit configured to receive a code comprising encoded parameter information related to a sample measurement and specific information that identifies a parameter to be updated based on the parameter information, the parameter information including information of a parameter that cannot be changed by a user administrator authority but can be changed by a service authority having a broader range of authority than the user administrator authority, and the code input unit configured to receive the code upon receiving an instruction of an operator having the user administrator authority;
   a decoding unit configured to decode the code received by the code input unit; and
   a control unit configured to:
      update, based on the parameter information generated by decoding the code by the decoding unit, a parameter value applied before decoding the code to provide an updated parameter value;
      determine whether or not the parameter value before the update that is identified by the specific information is different from the updated parameter value that is included in the parameter information included in the code, and rewrite the parameter value before the update that is identified by the specific information with the updated parameter value that is included in the parameter information included in the code only when the updated parameter value is different than the parameter value before the update; and
      display an error message on a display unit, and not rewrite the parameter value before the update with the updated parameter value that is included in the parameter information included in the code when the updated parameter value is not different than the parameter value before the update.

2. The automatic analyzer according to claim 1, wherein the code further comprises code applicable condition information for determining whether the parameter information included in the code is applicable,
   the automatic analyzer further comprises:
   a storage unit configured to store operation information of the automatic analyzer; and
   a conformity determination unit configured to determine whether the code applicable condition information generated by decoding the code by the decoding unit conforms to the operation information, and
   wherein the control unit updates the parameter based on the parameter information when the conformity determination unit determines that the code applicable condition information conforms to the operation information.

3. The automatic analyzer according to claim 2, wherein the code further comprises command information that defines a content of a process, and the control unit is configured to execute the command information when the conformity determination unit determines that the code applicable condition information conforms to the operation information.

4. The automatic analyzer according to claim 2, wherein when the conformity determination unit determines that the code applicable condition information conforms to the operation information, the control unit is configured to take a backup of a parameter before update identified by the specific information.

5. The automatic analyzer according to claim 2, wherein the code applicable condition information comprises at least one of code identification information, automatic analyzer model information, automatic analyzer identification information, software version information, and code expiration date information.

6. The automatic analyzer according to claim 1, wherein the code encoded is a character, a one-dimensional code, or a two-dimensional code.

7. The automatic analyzer according to claim 1, wherein the code input unit is a code reader configured to read a code printed on a sheet or a code displayed on a personal digital assistant.

8. The automatic analyzer according to claim 1, wherein the code encoded is encrypted, and
the decoding unit is configured to decode the encoded code using an encryption key.

9. The automatic analyzer according to claim 1, wherein the parameter value before the update and the parameter value after the update are not displayed on a display based on the user administrator authority.

10. A control method for an automatic analyzer, the method comprising:
receiving, by a code input unit, a code comprising encoded parameter information related to sample measurement and specific information that identifies a parameter to be updated based on the parameter information, the parameter information including information of a parameter that cannot be changed by a user administrator authority but can be changed by a service authority having a broader range of authority than the user administrator authority, and the code input unit configured to receive the code upon receiving an instruction of an operator having the user administrator authority;
decoding, by a decoding unit, the code received by the code input unit;
updating, by a control unit and based on the parameter information generated by decoding the code in the decoding step, a parameter value applied before decoding the code to provide an updated parameter value;
determining whether or not the parameter value before the update that is identified by the specific information is different from the updated parameter value that is included in the parameter information included in the code, and rewriting, by the control unit, the parameter value before the update that is identified by the specific information with the updated parameter value that is included in the parameter information included in the code only when the updated parameter value is different than the parameter value before the update; and
displaying, by the control unit, an error message on a display unit, and not rewriting, by the control unit, the parameter value before the update with the updated parameter value that is included in the parameter information included in the code when the updated parameter value is not different than the parameter value before the update.

11. The control method for an automatic analyzer according to claim 10, wherein the parameter value before the update and the parameter value after the update are not displayed on a display based on the user administrator authority.

12. An automatic analyzer comprising:
a code input unit configured to receive a code comprising encoded parameter information related to a sample measurement and specific information that identifies a parameter to be updated based on the parameter information, the parameter information including information of a parameter that cannot be changed by a user administrator authority but can be changed by a service authority having a broader range of authority than the user administrator authority, and the code input unit configured to receive the code upon receiving an instruction of an operator having the user administrator authority;
a decoding unit configured to decode the code received by the code input unit; and
a control unit configured to:
update, based on the parameter information generated by decoding the code by the decoding unit, a parameter value applied before decoding the code to provide an updated parameter value;
determine whether or not the parameter value before the update that is identified by the specific information is different from the updated parameter value that is included in the parameter information included in the code, and rewrite the parameter value before the update that is identified by the specific information with the updated parameter value that is included in the parameter information included in the code only when the updated parameter value is different than the parameter value before the update; and
backup the parameter value before the update only when the updated parameter value is different than the parameter value before the update.

* * * * *